(12) United States Patent
Zhang et al.

(10) Patent No.: US 12,418,128 B2
(45) Date of Patent: Sep. 16, 2025

(54) POWER CONNECTOR WITH INCREASED PLUGGING FORCE AND IMPROVED HEAT DISSIPATION PERFORMANCE

(71) Applicant: DONGGUAN XUNTAO ELECTRONIC CO., LTD., Dongguan (CN)

(72) Inventors: Jianming Zhang, Dongguan (CN); Xiaogang Liu, Dongguan (CN); Rongzhe Guo, Dongguan (CN)

(73) Assignee: DONGGUAN XUNTAO ELECTRONIC CO., LTD, Guangdong (CN)

( * ) Notice: Subject to any disclaimer, the term of this patent is extended or adjusted under 35 U.S.C. 154(b) by 310 days.

(21) Appl. No.: 18/222,152

(22) Filed: Jul. 14, 2023

(65) Prior Publication Data
US 2024/0178600 A1   May 30, 2024

(30) Foreign Application Priority Data

Nov. 29, 2022   (CN) .......................... 202211503723.4

(51) Int. Cl.
| | |
|---|---|
| *H01R 13/24* | (2006.01) |
| *H01R 12/70* | (2011.01) |
| *H01R 12/72* | (2011.01) |
| *H01R 13/516* | (2006.01) |

(52) U.S. Cl.
CPC ..... *H01R 13/2464* (2013.01); *H01R 12/7088* (2013.01); *H01R 12/721* (2013.01); *H01R 12/724* (2013.01); *H01R 12/727* (2013.01); *H01R 13/516* (2013.01)

(58) Field of Classification Search
CPC .............................. H01R 13/50; H01R 13/115

USPC ................................ 439/839, 856, 857, 947
See application file for complete search history.

(56) References Cited

U.S. PATENT DOCUMENTS

| | | | |
|---|---|---|---|
| 4,932,877 | A | 6/1990 | Zinn |
| 4,932,891 | A | 6/1990 | Spanke et al. |
| D449,834 | S | 10/2001 | Chou et al. |
| D483,330 | S | 12/2003 | Chen |
| D569,802 | S | 5/2008 | Long et al. |

(Continued)

FOREIGN PATENT DOCUMENTS

TW   I723536 B   4/2021

OTHER PUBLICATIONS

U.S. Office Action for U.S. Appl. No. 29/882,374, dated Jan. 3, 2025.

*Primary Examiner* — Phuong K Dinh
(74) *Attorney, Agent, or Firm* — Birch, Stewart, Kolasch & Birch, LLP

(57) ABSTRACT

A power connector includes an insulating body and a power terminal module. The power terminal module includes a first power terminal and a second power terminal. The first power terminal includes a first elastic arm, a second elastic arm, a first abutting arm and a second abutting arm. The second power terminal includes a third elastic arm, a fourth elastic arm and a space between the third elastic arm and the fourth elastic arm. The first elastic arm and the second elastic arm extend into the space. The first abutting arm abuts against the third elastic arm. The second abutting arm abuts against the fourth elastic arm. As a result, the power connector has greater plugging force and better heat dissipation performance.

20 Claims, 17 Drawing Sheets

(56) References Cited

U.S. PATENT DOCUMENTS

| | | | |
|---|---|---|---|
| D624,017 S | 9/2010 | Liu et al. | |
| 7,909,663 B1 | 3/2011 | Bouffet | |
| D665,360 S | 8/2012 | Gieski | |
| D668,621 S | 10/2012 | Gieski | |
| D684,934 S | 6/2013 | Ngo | |
| D729,742 S | 5/2015 | Wu et al. | |
| D750,025 S | 2/2016 | Buck et al. | |
| D768,089 S | 10/2016 | Liu | |
| 9,711,926 B2 | 7/2017 | Belanger, Jr. | |
| D824,866 S | 8/2018 | Matsubara et al. | |
| D828,811 S | 9/2018 | Aoshima et al. | |
| 10,283,895 B1 * | 5/2019 | Probert | H01R 13/18 |
| 10,396,482 B2 * | 8/2019 | Glick | H01R 13/08 |
| D869,400 S | 12/2019 | Wu | |
| 10,637,175 B1 | 4/2020 | Zou et al. | |
| 10,826,215 B2 * | 11/2020 | Zhang | H01R 4/025 |
| D921,588 S | 6/2021 | Chen et al. | |
| D986,831 S | 5/2023 | Morishita et al. | |
| D1,026,827 S | 5/2024 | Morishita et al. | |
| D1,032,531 S | 6/2024 | Obata | |
| D1,033,363 S | 7/2024 | Obata | |
| D1,034,473 S | 7/2024 | Kamei et al. | |

\* cited by examiner

POWER CONNECTOR WITH INCREASED PLUGGING FORCE AND IMPROVED HEAT DISSIPATION PERFORMANCE

CROSS-REFERENCE TO RELATED APPLICATION

This patent application claims priority of a Chinese Patent Application No. 202211503723.4, filed on Nov. 29, 2022 and titled "POWER CONNECTOR", the entire content of which is incorporated herein by reference.

TECHNICAL FIELD

The present disclosure relates to a power connector, which belongs to the technical field of connectors.

BACKGROUND

A power connector in the related art generally includes an insulating body and a plurality of power terminals. The insulating body defines a mating slot. The power terminal includes an elastic arm extending into the mating slot.

As power connectors have higher and higher requirements for power transmission, how to improve the plugging force and heat dissipation is a technical problem to be solved by those skilled in the art.

SUMMARY

An object of the present disclosure is to provide a power connector with greater plugging force and better heat dissipation performance.

In order to achieve the above object, the present disclosure adopts the following technical solution: a power connector, including: an insulating body including a first mating surface and a first mating slot extending through the first mating surface: and a power terminal module fixed to the insulating body, the power terminal module including a first power terminal and a second power terminal, the first power terminal including a first fixing portion and a plurality of elastic arms extending from the first fixing portion: the plurality of elastic arms of the first power terminal including a first elastic arm, a second elastic arm arranged side by side with the first elastic arm, a first abutting arm arranged side by side with the first elastic arm and away from the second elastic arm, and a second abutting arm arranged side by side with the second elastic arm and away from the first elastic arm: the first abutting arm, the first elastic arm, the second elastic arm and the second abutting arm being arranged at intervals along a first direction; the first elastic arm and the second elastic arm being located between the first abutting arm and the second abutting arm: the first elastic arm including a first mating portion protruding into the first mating slot: the second elastic arm including a second mating portion protruding into the first mating slot: wherein the second power terminal includes a second fixing portion and a plurality of elastic arms extending from the second fixing portion: the plurality of elastic arms of the second power terminal include a third elastic arm and a fourth elastic arm: the first fixing portion and the second fixing portion are arranged along a second direction perpendicular to the first direction; the third elastic arm and the fourth elastic arm are arranged at intervals along the first direction; the second power terminal further includes a space between the third elastic arm and the fourth elastic arm along the first direction: the third elastic arm includes a third mating portion protruding into the first mating slot: and the fourth elastic arm includes a fourth mating portion protruding into the first mating slot: and wherein the first elastic arm and the second elastic arm extend into the space: the first abutting arm abuts against the third elastic arm along the second direction: and the second abutting arm abuts against the fourth elastic arm along the second direction.

In order to achieve the above object, the present disclosure adopts the following technical solution: a power connector, including: an insulating body including a first mating surface and a first mating slot extending through the first mating surface: a first power terminal including a first fixing portion fixed to the insulating body and a plurality of elastic arms extending from the first fixing portion: the plurality of elastic arms of the first power terminal including a first elastic arm, a second elastic arm arranged side by side with the first elastic arm, a first abutting arm arranged side by side with the first elastic arm and away from the second elastic arm, and a second abutting arm arranged side by side with the second elastic arm and away from the first elastic arm: the first abutting arm, the first elastic arm, the second elastic arm and the second abutting arm being arranged at intervals along a first direction: the first elastic arm and the second elastic arm being located between the first abutting arm and the second abutting arm: the first elastic arm including a first mating portion protruding into the first mating slot: the second elastic arm including a second mating portion protruding into the first mating slot: and a second power terminal including a second fixing portion fixed to the insulating body and a plurality of elastic arms extending from the second fixing portion: the plurality of elastic arms of the second power terminal including a third elastic arm and a fourth elastic arm: the first fixing portion and the second fixing portion being arranged along a second direction perpendicular to the first direction; the third elastic arm and the fourth elastic arm being arranged at intervals along the first direction; the second power terminal further including a space between the third elastic arm and the fourth elastic arm along the first direction; the third elastic arm including a third mating portion protruding into the first mating slot; and the fourth elastic arm including a fourth mating portion protruding into the first mating slot: and wherein the first elastic arm and the second elastic arm extend into the space: the first abutting arm abuts against the third elastic arm along the second direction: and the second abutting arm abuts against the fourth elastic arm along the second direction.

Compared with the prior art, the present disclosure is provided with the first abutting arm and the second abutting arm which are abutting against the third elastic arm and the fourth elastic arm, respectively, thereby increasing the plugging force of the third elastic arm and the fourth elastic arm when mating with a mating connector. In addition, since the first abutting arm and the second abutting arm abut against the third elastic arm and the fourth elastic arm respectively, the heat dissipation area of the third elastic arm and the fourth elastic arm is increased, thereby improving the heat dissipation performance.

DETAILED DESCRIPTION

Figure 1:
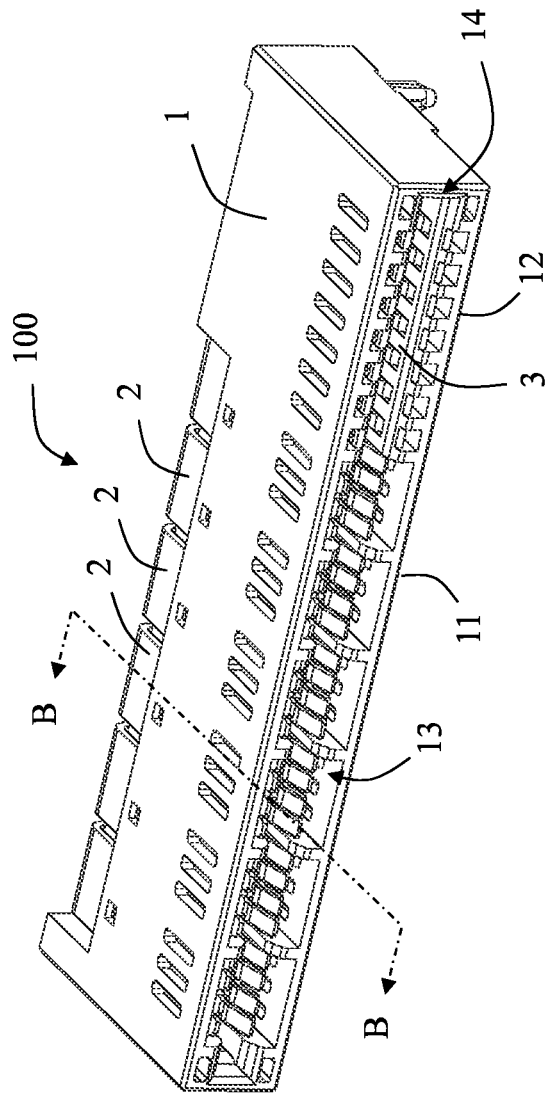
FIG. 1 is a schematic perspective view of a power connector in accordance with a first embodiment of the present disclosure.
Figure 2:
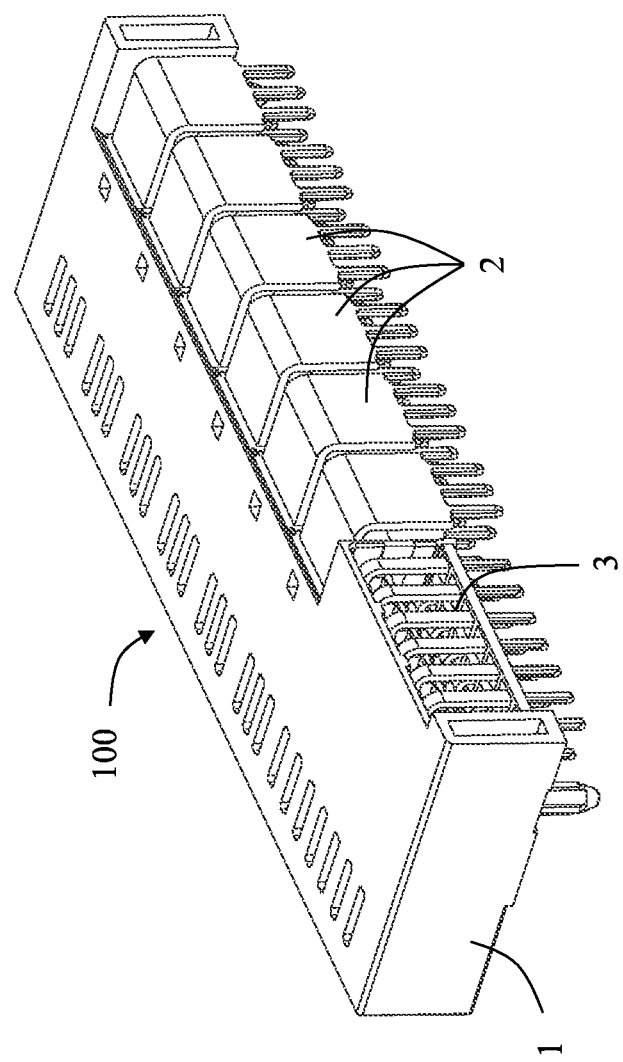
FIG. 2 is a schematic perspective view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one: "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 4, the present disclosure discloses a power connector 100 which is used to be mounted on a circuit board (not shown), and mates with a mating connector (not shown) to at least transmit electricity. In a first embodiment shown in the present disclosure, the power connector 100 includes an insulating body 1, a plurality of power terminal modules 2 and a plurality of conductive terminals 3.

Figure 3:
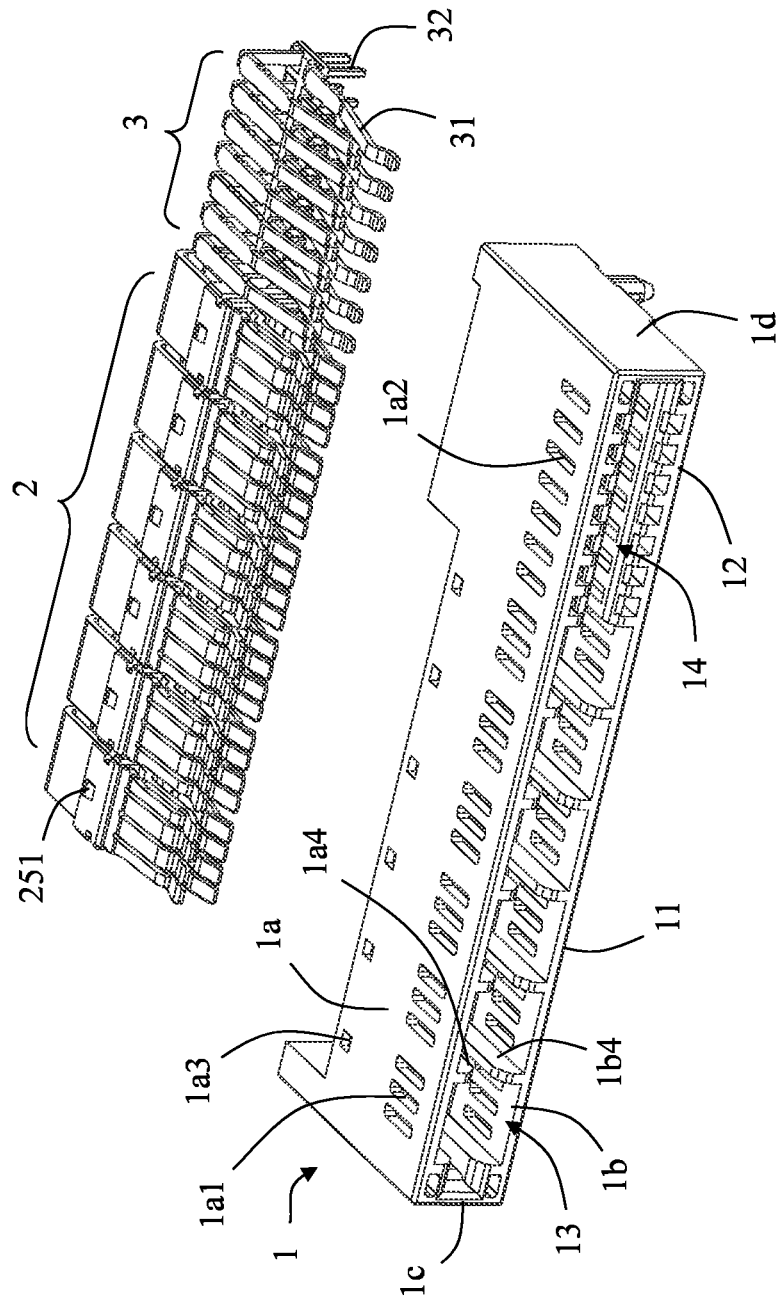
FIG. 3 is a partial perspective exploded view of FIG. 1.
Figure 4:
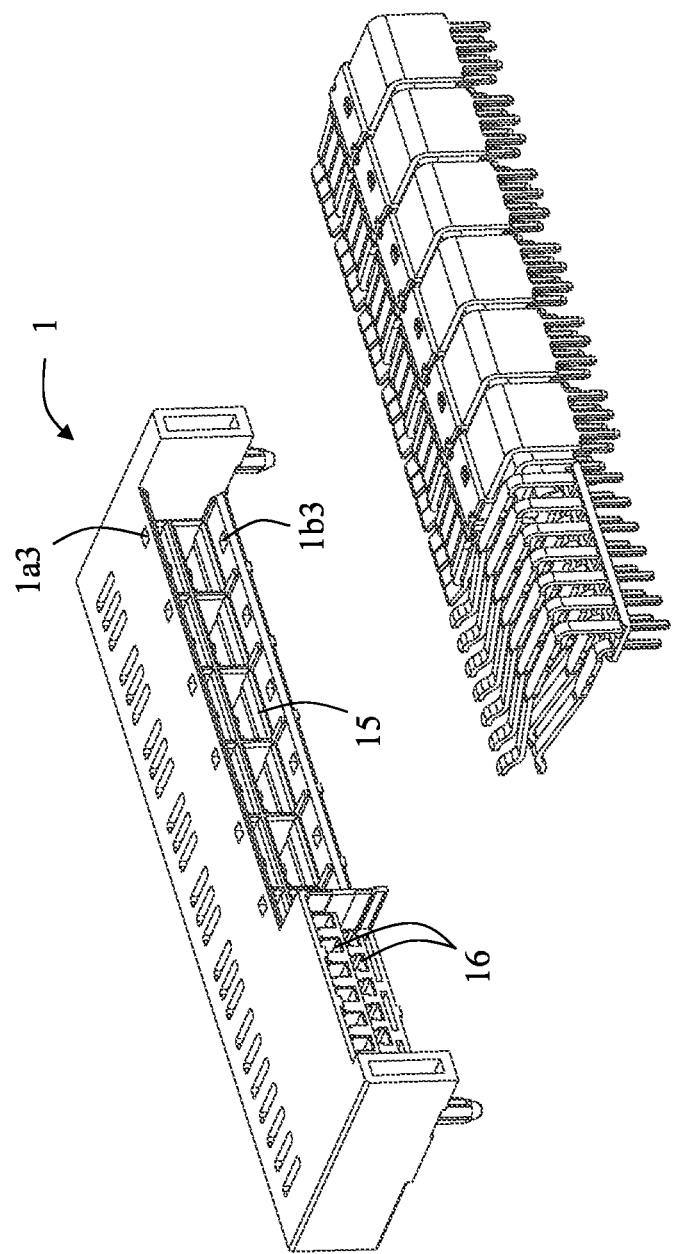
FIG. 4 is a partial perspective exploded view of FIG. 3 from another angle.

Referring to FIG. 3 and FIG. 4, the insulating body 1 includes a first mating surface 11, a second mating surface 12, a first mating slot 13 extending through the first mating surface 11, a second mating slot 14 extending through the second mating surface 12, an installation space 15 communicating with the first mating slot 13, and a plurality of installation slots 16 communicating with the second mating slot 14. In the illustrated embodiment of the present disclosure, the first mating surface 11 and the second mating surface 12 are located in a same plane.

Figure 16:
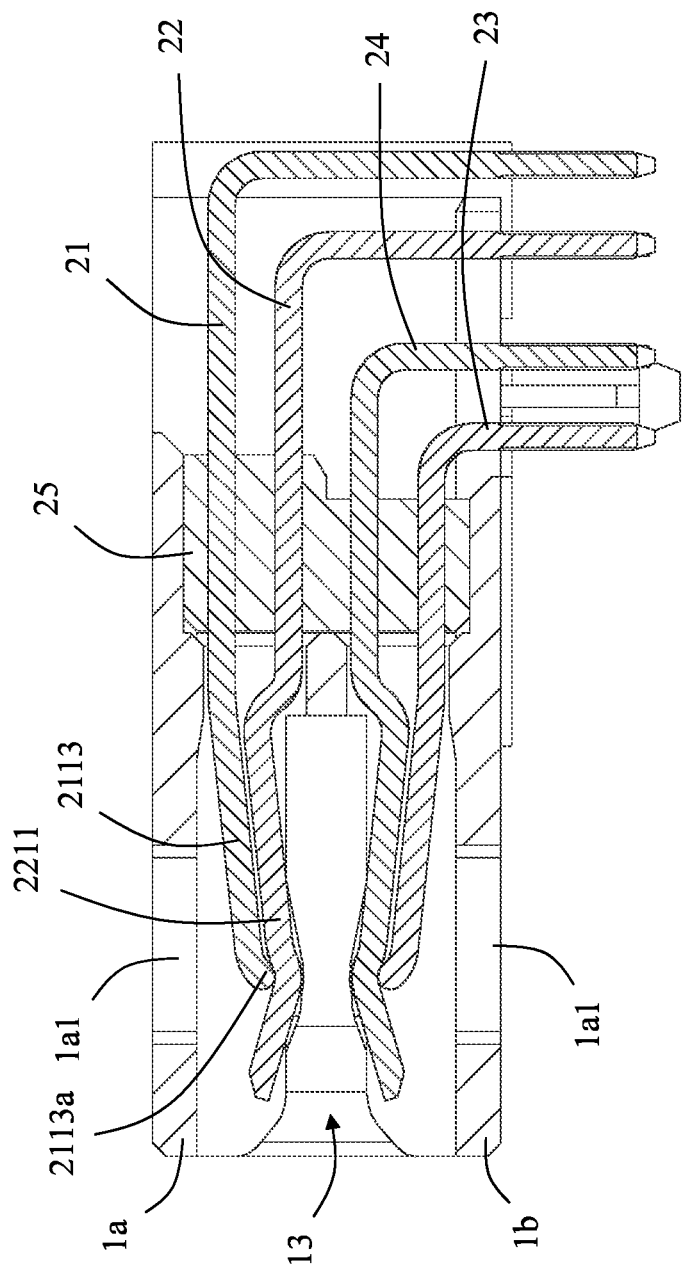
FIG. 16 is a schematic cross-sectional view taken along line B-B in FIG. 1.
Figure 17:
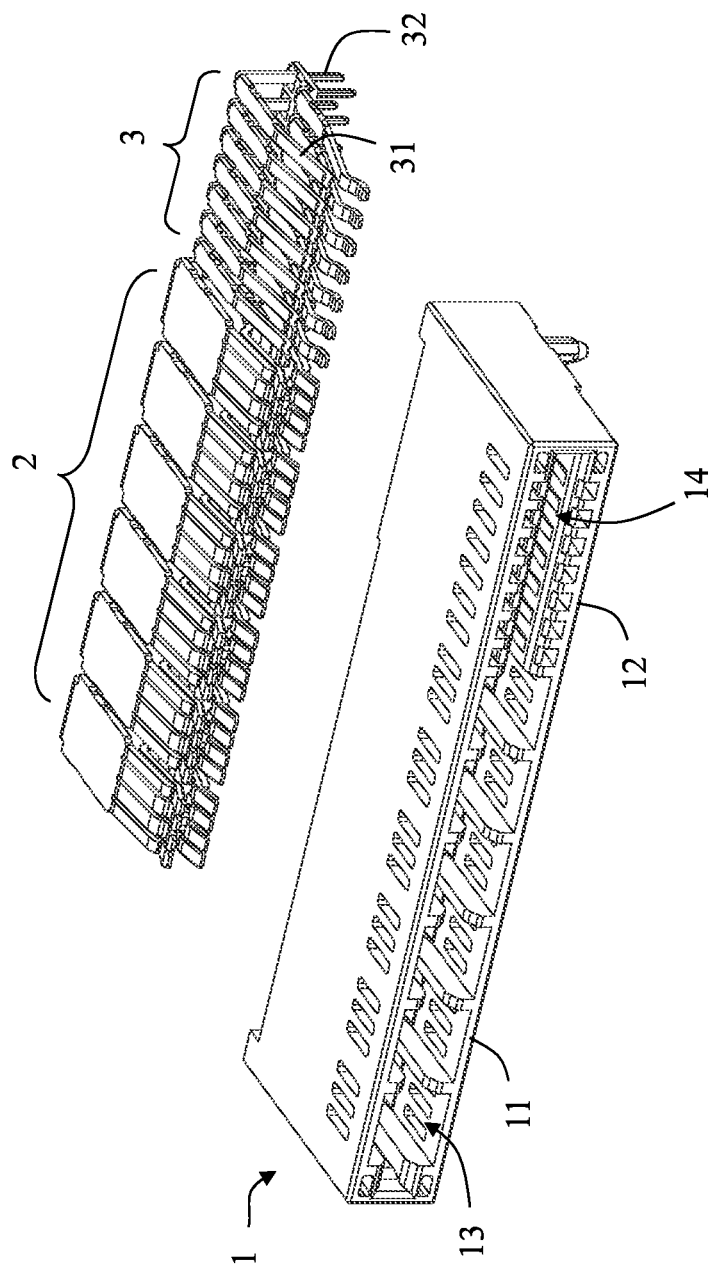
FIG. 17 is an exploded perspective view of the power connector in accordance with a second embodiment of the present disclosure.
Figure 18:
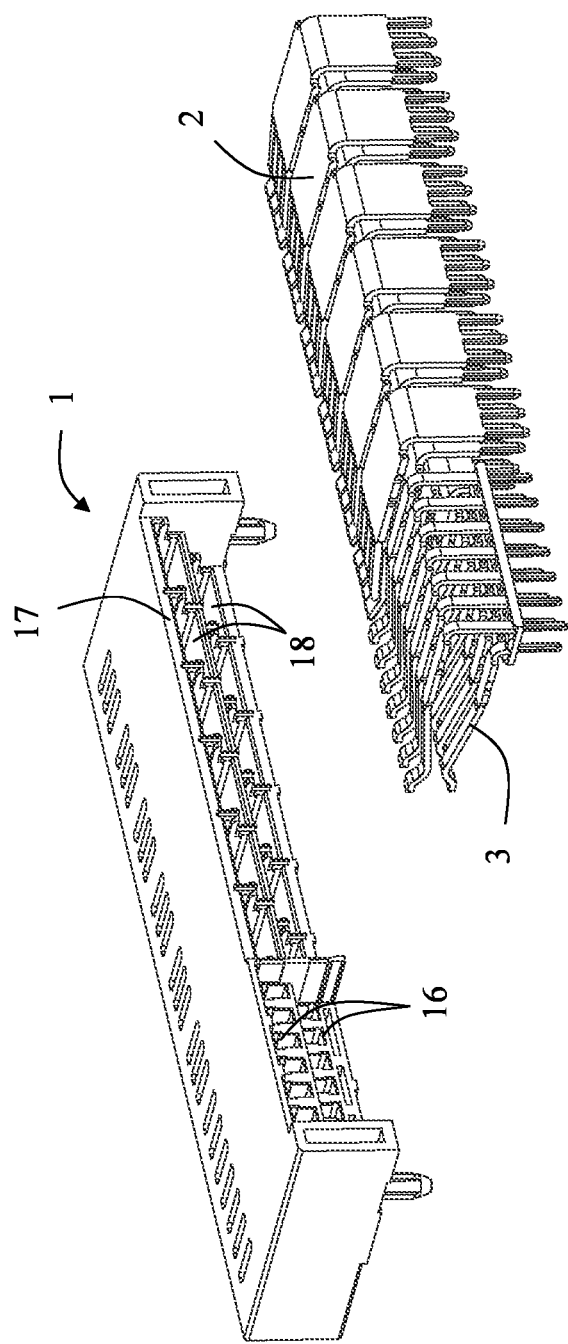
FIG. 18 is a perspective exploded view of FIG. 17 from another angle.

In the illustrated embodiment of the present disclosure, the insulating body 1 includes a top wall 1a, a bottom wall 1b, a first side wall 1c, and a second side wall 1d. The first mating slot 13 and the second mating slot 14 are located between the top wall 1a and the bottom wall 1b. The first mating slot 13 and the second mating slot 14 are located between the first side wall 1c and the second side wall 1d. Referring to FIG. 3 and FIG. 16, the top wall 1a and/or the bottom wall 1b are provided with a plurality of first heat-dissipation slots 1a1 communicating with the first mating slot 13 and a plurality of second heat-dissipation slots 1a2 communicating with the second mating slot 14. The top wall 1a also defines a first locking hole 1a3 at a rear end thereof. The bottom wall 1b also defines a second locking hole 1b3 at a rear end thereof. The first locking hole 1a3 and the second locking hole 1b3 are used for locking with the power terminal module 2 so as to prevent the power terminal module 2 from detaching from the insulating body 1.

Referring to FIG. 3, the top wall 1a of the insulating body 1 is further provided with a plurality of first partitions 1a4 protruding downwardly. The bottom wall 1b is further provided with a plurality of second partitions 1b4 protruding upwardly. The first partitions 1a4 are vertically aligned with corresponding second partitions 1b4. The first partitions 1a4 and the second partitions 1b4 divide the first mating slot 13 into a plurality of sub-slots. Each sub-slot corresponds to one power terminal module 2.

Figure 11:
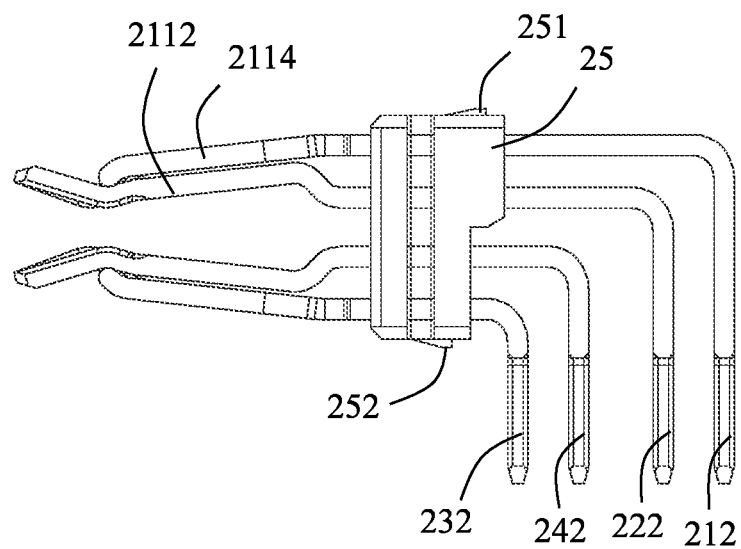
FIG. 11 is a right view of FIG. 5.
Figure 12:
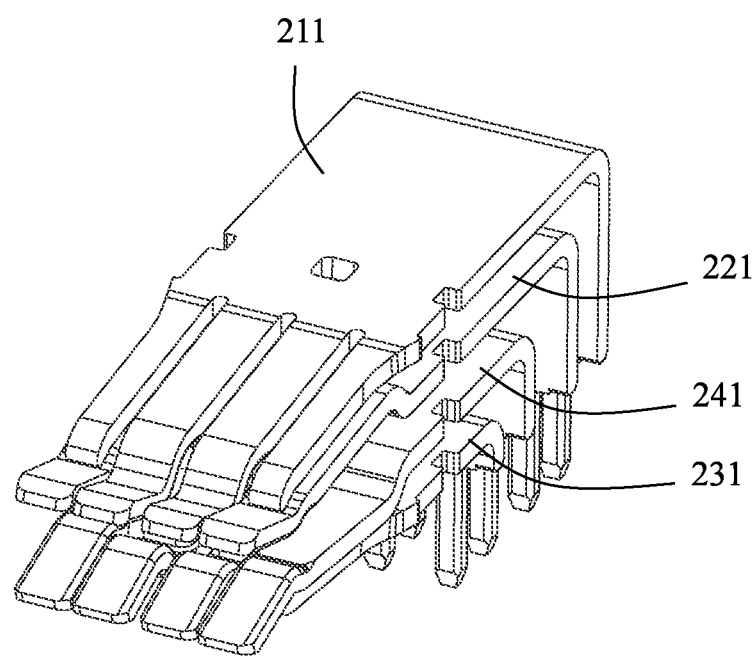
FIG. 12 is a schematic perspective view after removing an insulating block in FIG. 5.

In the illustrated embodiment of the present disclosure, the structures of the plurality of power terminal modules 2 are the same. The power terminal module 2 is at least partially installed in the installation space 15. Referring to FIGS. 5 to 16, each power terminal module 2 includes a first power terminal 21, a second power terminal 22, a third power terminal 23, a fourth power terminal 24, and an insulating block 25 fixed on the first power terminal 21, the second power terminal 22, the third power terminal 23 and the fourth power terminal 24. Preferably, the first power terminal 21, the second power terminal 22, the third power terminal 23 and the fourth power terminal 24 are insert-molded with the insulating block 25. Referring to FIG. 3, FIG. 4 and FIG. 11, the insulating block 25 includes a first locking protrusion 251 which is locked in the first locking hole 1a3 and a second locking protrusion 252 which is locked in the second locking hole 1b3.

Referring to FIG. 13 to FIG. 16, the first power terminal 21 is substantially L-shaped, and includes a first fixing portion 211, a plurality elastic arms extending from the first fixing portion 211, and a plurality of first mounting portions 212. The elastic arms of the first power terminal 21 include a first elastic arm 2111, a second elastic arm 2112 arranged side by side with the first elastic arm 2111, a first abutting arm 2113 arranged side by side with the first elastic arm 2111 and away from the second elastic arm 2112, and a second abutting arm 2114 arranged side by side with the second elastic arm 2112 and away from the first elastic arm 2111. The first abutting arm 2113, the first elastic arm 2111, the second elastic arm 2112 and the second abutting arm 2114 are arranged at intervals along a first direction A1-A1 (for example, a left-right direction). In the first direction A1-A1, the first elastic arm 2111 and the second elastic arm 2112 are located between the first abutting arm 2113 and the second abutting arm 2114. The first elastic 30) arm 2111 includes a first mating portion 2111a protruding into the first mating slot 13. The first mating portion 2111a includes a first arc-shaped contact surface 2111a1 and a first recess 2111a2 opposite to the first arc-shaped contact surface 2111a1.

The second elastic arm 2112 includes a second mating portion 2112a protruding into the first mating slot 13. The second mating portion 2112a includes a second arc-shaped contact surface 2112a1 and a second recess 2112a2 opposite to the second arc-shaped contact surface 2112a1.

The second power terminal 22 is substantially L-shaped, and includes a second fixing portion 221, a plurality of elastic arms extending from the second fixing portion 221, and a plurality of second mounting portions 222. The elastic arms of the second power terminal 22 include a third elastic arm 2211 and a fourth elastic arm 2212. The first fixing portion 211 and the second fixing portion 222 are arranged along a second direction A2-A2 (for example, a top-bottom direction) perpendicular to the first direction A1-A1. The third elastic arm 2211 and the fourth elastic arm 2212 are arranged at intervals along the first direction A1-A1. The second power terminal 22 further includes a space 2210 between the third elastic arm 2211 and the fourth elastic arm 2212 along the first direction A1-A1. The first elastic arm 2111 and the second elastic arm 2112 extend into the space 2210. The third elastic arm 2211 includes a third mating portion 2211a protruding into the first mating slot 13. The third mating portion 2211a includes a third arc-shaped contact surface 2211a1 and a third recess 2211a2 opposite to the third arc-shaped contact surface 2211a1.

The fourth elastic arm 2212 includes a fourth mating portion 2212a protruding into the first mating slot 13. The fourth mating portion 2212a includes a fourth arc-shaped contact surface 2212a1 and a fourth recess 2212a2 opposite to the fourth arc-shaped contact surface 2212a1.

Figure 14:
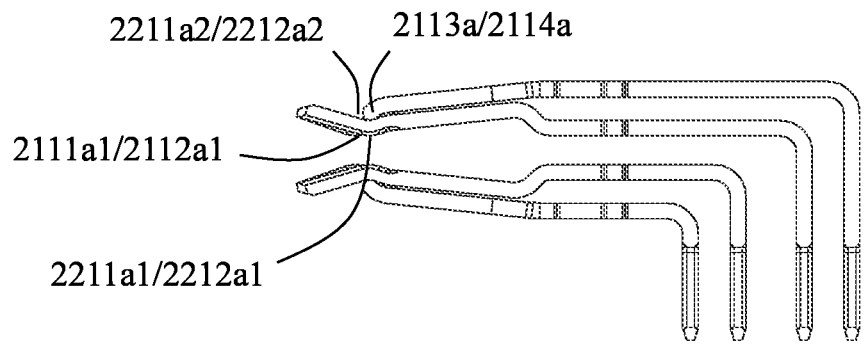
FIG. 14 is a right view of FIG. 12.
Figure 15:
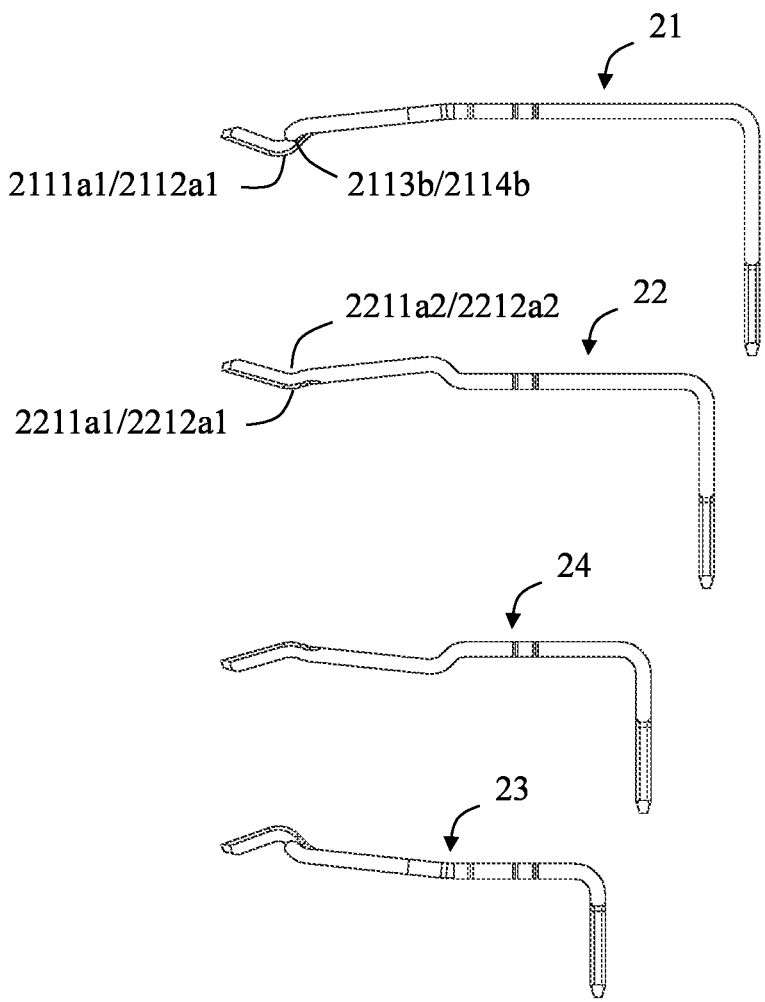
FIG. 15 is a right view of FIG. 13.

Referring to FIG. 14, in the embodiment shown in the present disclosure, a top of the first arc-shaped contact surface 2111a1, a top of the second arc-shaped contact surface 2112a1, a top of the third arc-shaped contact surface 2211a1 and a top of the fourth arc-shaped contact surface 2212a1 are located in a same plane. With such arrangement, it is beneficial to improve the stability when mated with the mating connector.

Figure 13:
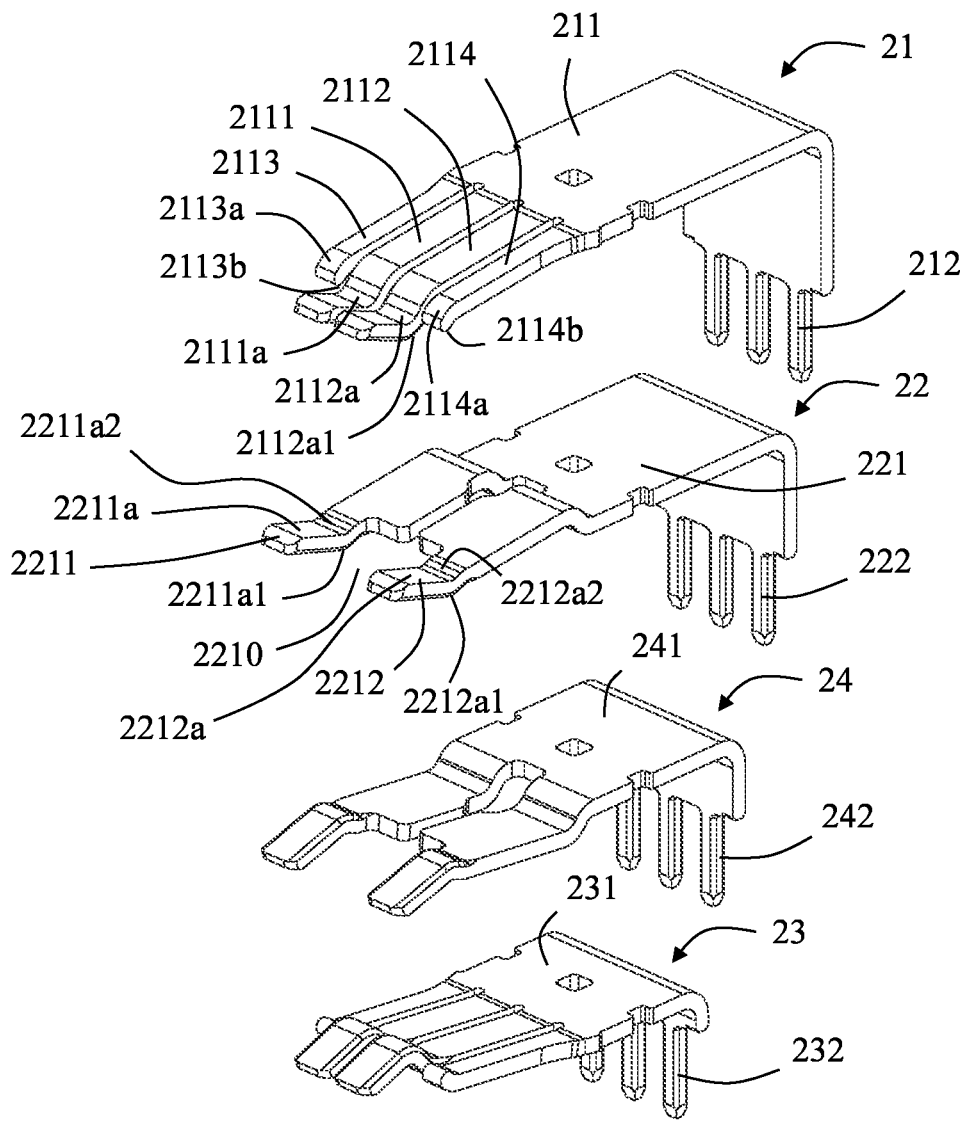
FIG. 13 is a perspective exploded view of FIG. 12.

As shown in FIG. 13, the first abutting arm 2113 abuts against the third elastic arm 2211 along the second direction A2-A2. The second abutting arm 2114 abuts against the fourth elastic arm 2212 along the second direction A2-A2. The first abutting arm 2113 has a first free end 2113a. The second abutting arm 2114 has a second free end 2114a. The first free end 2113a extends into the third recess 2211a2 to abut against the third mating portion 2211a. The second free end 2114a extends into the fourth recess 2212a2 to abut against the fourth mating portion 2212a.

Referring to FIG. 14, in the embodiment shown in the present disclosure, the first free end 2113a is bent toward the third mating portion 2211a, and the second free end 2114a is bent toward the fourth mating portion 2212a.

Along a third direction A3-A3 (for example, a front-rear direction) which is perpendicular to the first direction A1-A1 and the second direction A2-A2, a length of the first abutting arm 2113 is shorter than a length of the third elastic arm 2211, and a length of the second abutting arm 2114 is smaller than a length of the fourth elastic arm 2212. The first free end 2113a is provided with a first arc-shaped surface 2113b abutting against the third mating portion 2211a. The second free end 2114a is provided with a second arc-shaped surface 2114b abutting against the fourth mating portion 2212a. With this arrangement, when the mating connector is inserted, the third elastic arm 2211 and the fourth elastic arm 2212 are pressed and deformed along the third direction A3-A3 in a direction away from the first mating slot 13. At this time, the first abutting arm 2113 and the second abutting arm 2114 are pushed away and deform in a direction away from the first mating slot 13 along the third direction A3-A3 due to being indirectly pressed by the mating connector. At the same time, the first abutting arm 2113 and the second abutting arm 2114 apply restoring force to the third elastic arm 2211 and the fourth elastic arm 2212, respectively, so as to increase the plugging force, thereby facilitating the mating stability between the mating connector and the power connector 100. At the same time, since the first abutting arm 2113 and the second abutting arm 2114 abut against the third elastic arm 2211 and the fourth elastic arm 2212, respectively, the heat dissipation area is increased, which is beneficial to improve the heat dissipation performance. By providing the first arc-shaped surface 2113b and the second arc-shaped surface 2114b, it is avoided that when the third elastic arm 2211 and the fourth elastic arm 2212 are deforming, excessive scraping of the third elastic arm 2211 and the fourth elastic arm 2212 with respect to the first abutting arm 2113 and the second abutting arm 2114, respectively occurs, thereby reducing the possibility of cause safety hazards. In addition, by providing the first abutting arm 2113 and the second abutting arm 2114, while increasing the area, it is also beneficial for the third elastic arm 2211 and the fourth elastic arm 2212 to transmit larger current.

Figure 8:
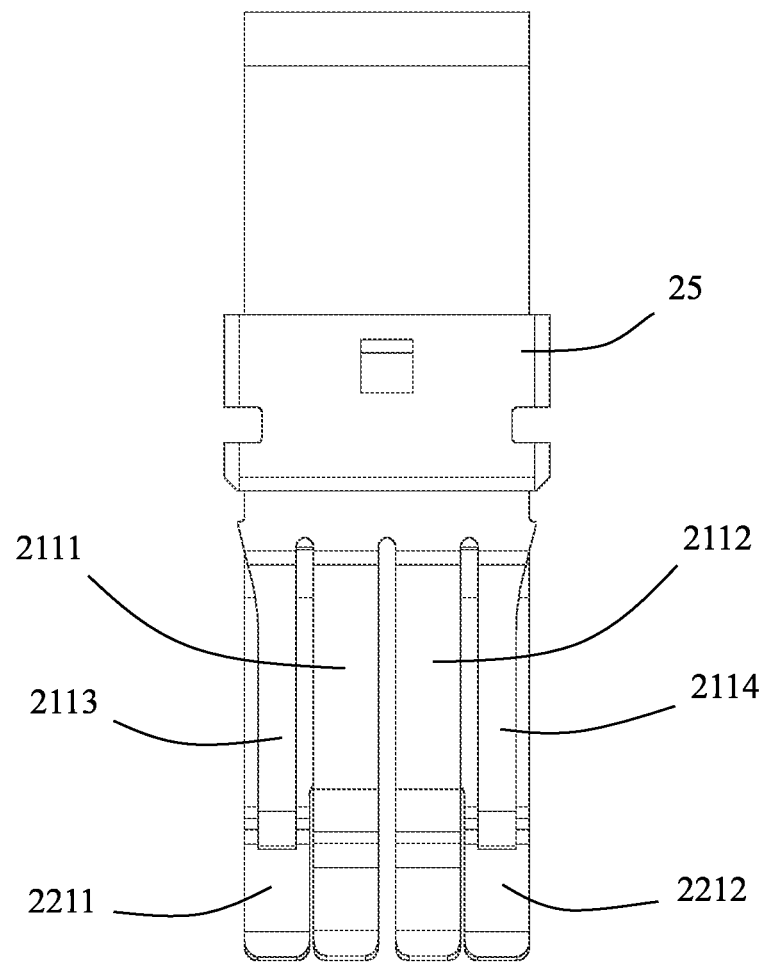
FIG. 8 is a top view of FIG. 5.
Figure 8:
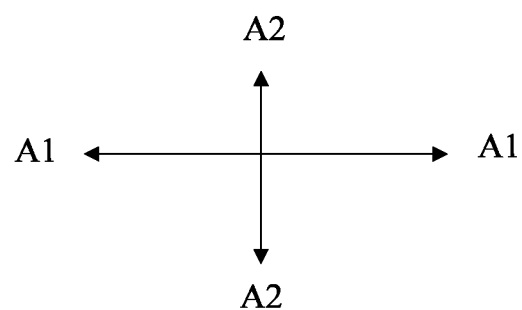
Figure 9:
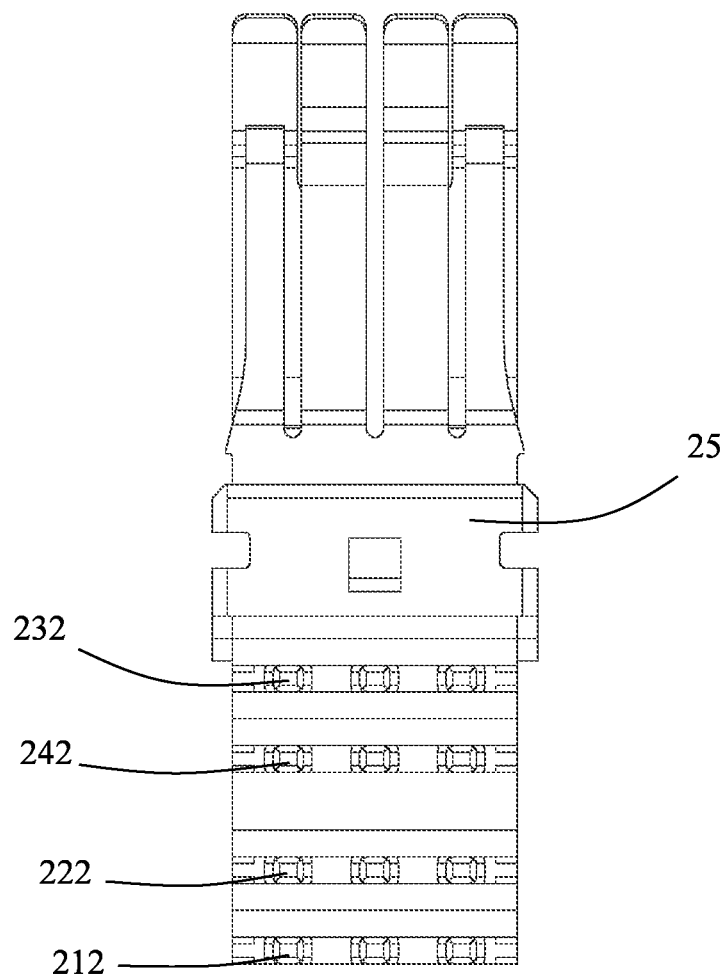
FIG. 9 is a bottom view of FIG. 5.
Figure 10:
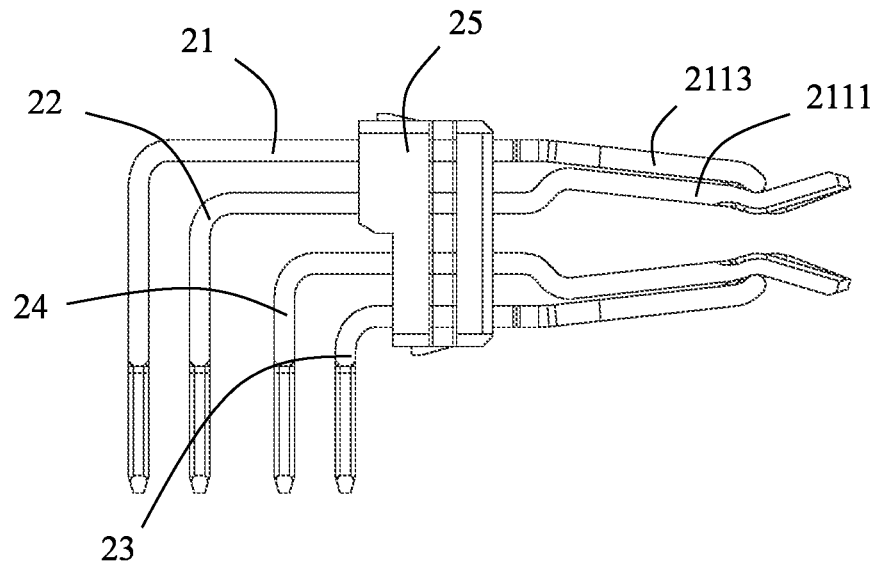
FIG. 10 is a left view of FIG. 5.

Referring to FIG. 8, in the embodiment shown in the present disclosure, a width of the first abutting arm 2113 along the first direction A1-A1 is smaller than a width of the first elastic arm 2111 along the first direction A1-A1. The width of the first abutting arm 2113 along the first direction A1-A1 is smaller than a width of the second elastic arm 2112 along the first direction A1-A1. A width of the second abutting arm 2114 along the first direction A1-A1 is smaller than the width of the first elastic arm 2111 along the first direction A1-A1. The width of the second abutting arm 2114 along the first direction A1-A1 is smaller than the width of the second elastic arm 2112 along the first direction A1-A1. With this arrangement, the insertion and extraction force will not be increased excessively, and the design balance will be achieved in terms of transmitting a large current.

The third power terminal 23 is substantially L-shaped, and includes a third fixing portion 231, a plurality of elastic arms extending from the third fixing portion 231, and a plurality of third mounting portions 232. The elastic arms of the third power terminal 23 and the elastic arms of the first power terminal 21 are symmetrically arranged on two sides of the first mating slot 13.

The fourth power terminal 24 is substantially L-shaped, and includes a fourth fixing portion 241, a plurality of elastic arms extending from the fourth fixing portion 241, and a plurality of fourth mounting portions 242. The elastic arms of the fourth power terminal 24 and the elastic arms of the second power terminal 22 are symmetrically arranged on the two sides of the first mating slot 13.

In the illustrated embodiment of the present disclosure, the first fixing portion 211, the second fixing portion 221, the third fixing portion 231 and the fourth fixing portion 241 are all fixed to the insulating block 25. The insulating block 25 is at least partially installed in the installation space 15. Preferably, the first fixing portion 211, the second fixing portion 221, the third fixing portion 231 and the fourth fixing portion 241 are insert-molded with the insulating block 25.

The first mounting portions 212, the second mounting portions 222, the third mounting portions 232 and the fourth mounting portions 242 are configured to be mounted on the circuit board. The first mounting portions 212, the second mounting portions 222, the third mounting portions 232 and the fourth mounting portions 242 are arranged at intervals along the third direction A3-A3.

Referring to FIG. 17 to FIG. 20, the power connector 100 in a second embodiment of the present disclosure is disclosed and includes an insulating body 1, a plurality of power terminal modules 2 and a plurality of conductive terminals 3. The plurality of power terminal modules 2 are assembled and fixed to the insulating body 1.

The insulating body 1 includes a first mating surface 11, a second mating surface 12, a first mating slot 13 extending through the first mating surface 11, a second mating slot 14 extending through the second mating surface 12, a first mounting surface 17 opposite to the first mating surface 11, a plurality of terminal assembly grooves 18 extending through the first mounting surface 17 and communicating with the first mating slot 13, and a plurality of installation slots 16 communicating with the second mating slot 14.

Figure 5:
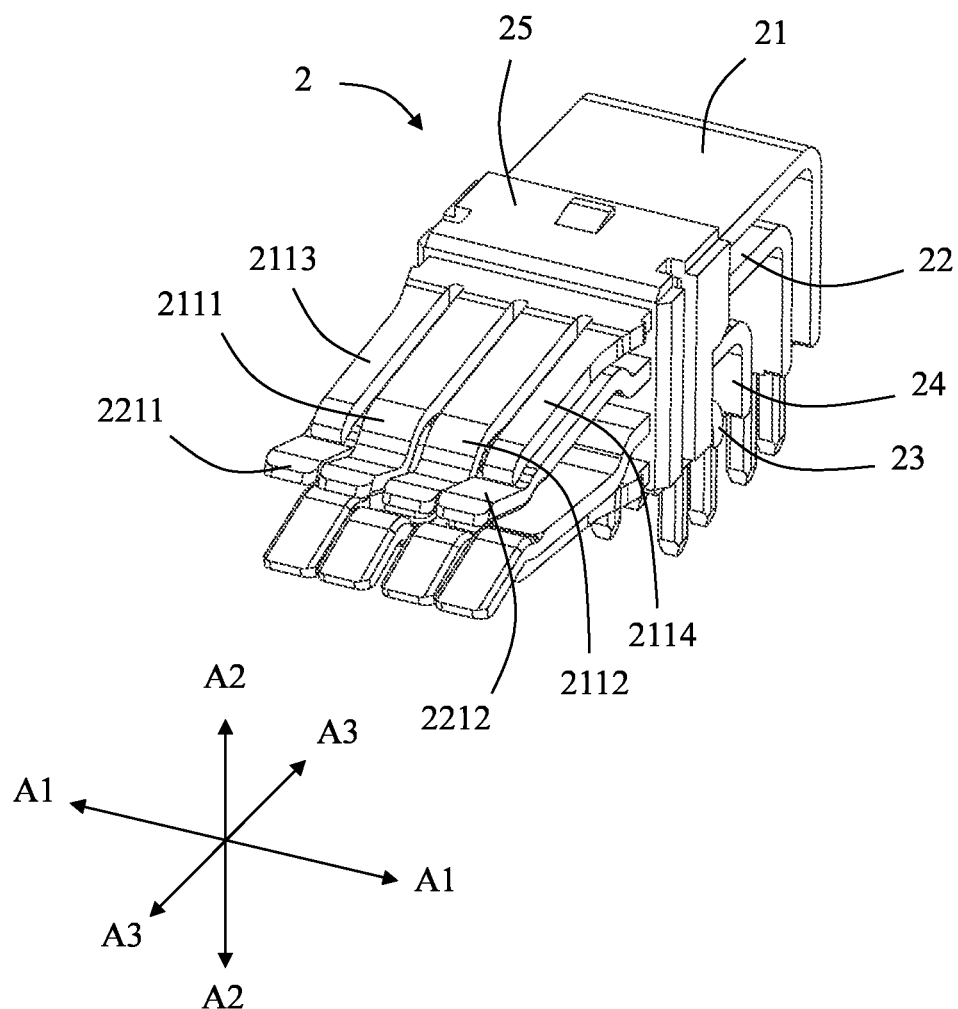
FIG. 5 is a perspective schematic view of a group of power terminals in FIG. 3.
Figure 6:
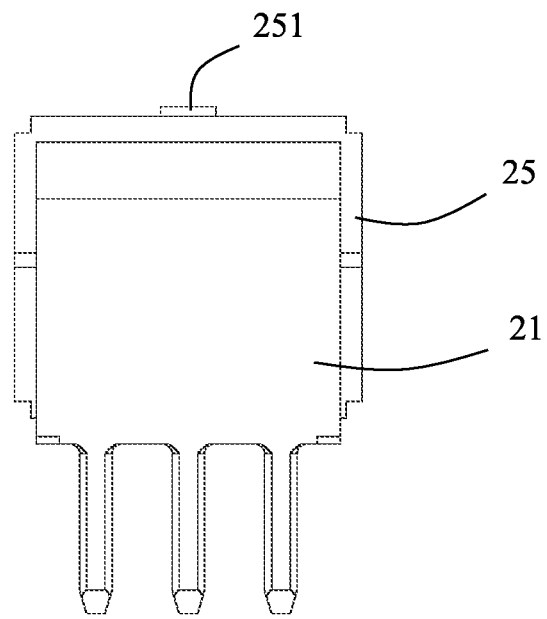
FIG. 6 is a rear view of FIG. 5.
Figure 7:
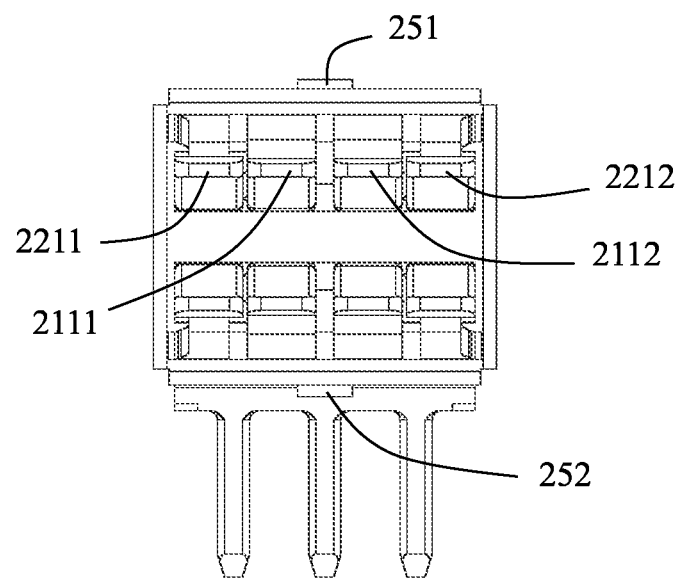
FIG. 7 is a front view of FIG. 5.
Figure 19:
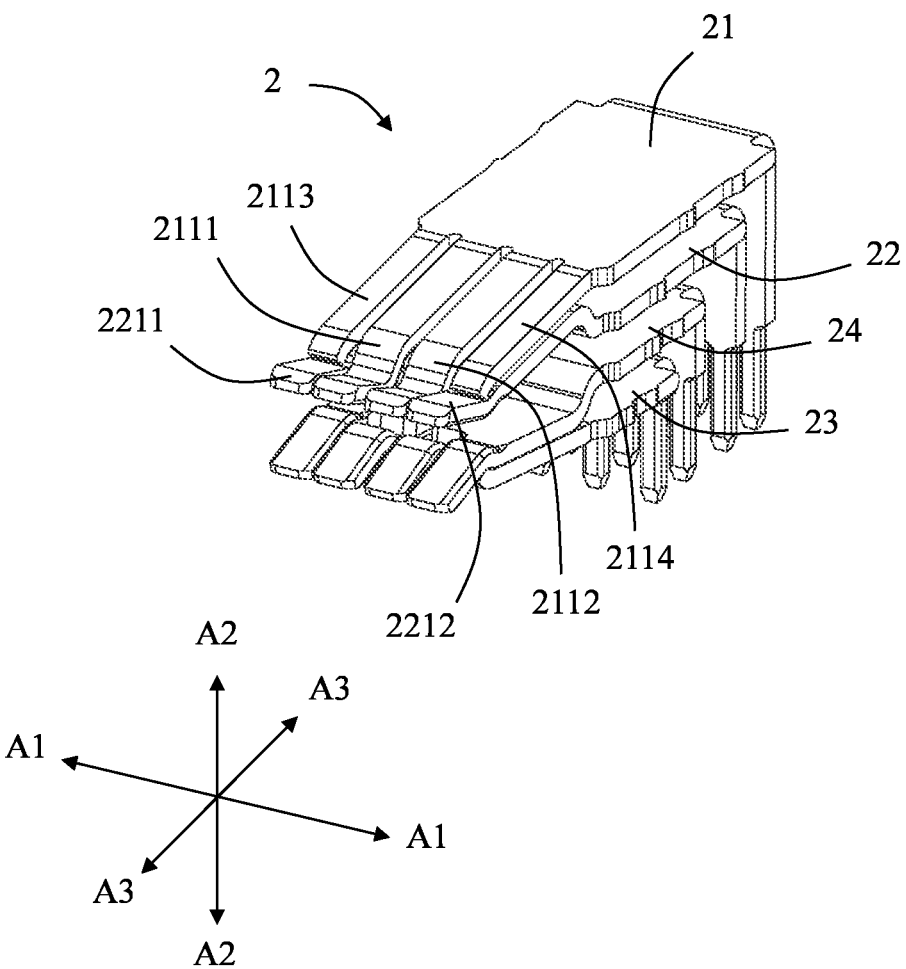
FIG. 19 is a perspective schematic view of a group of power terminal modules in FIG. 17.
Figure 20:
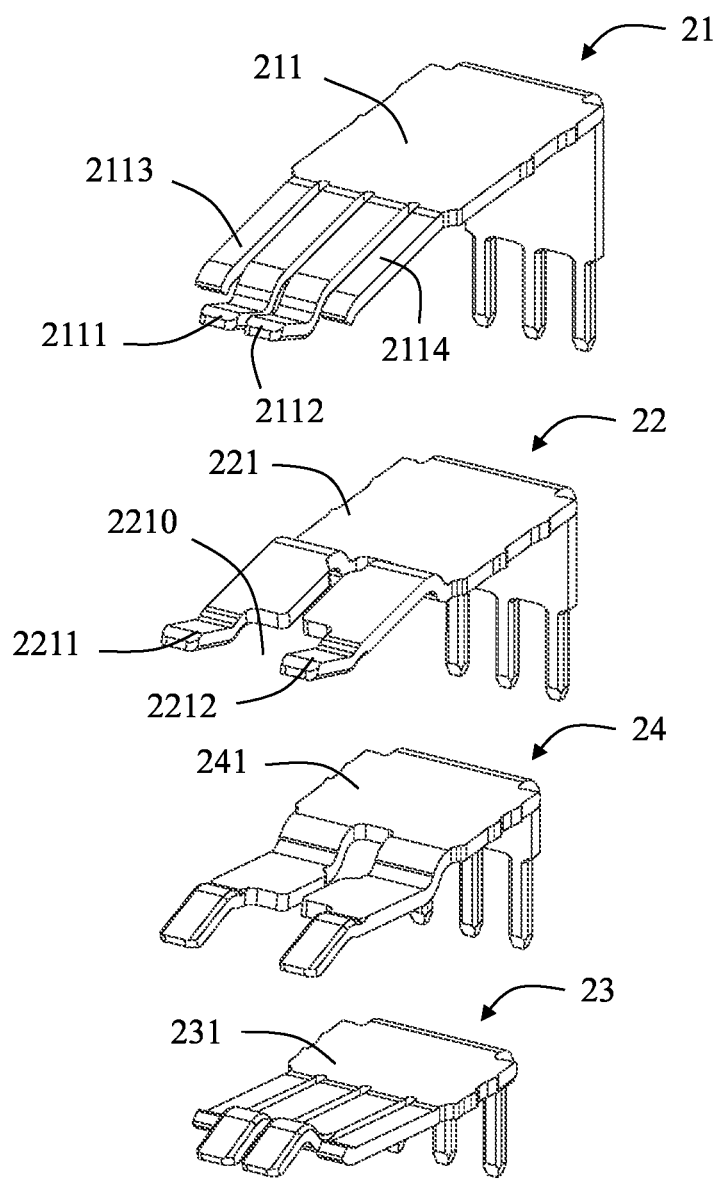
FIG. 20 is an exploded perspective view of FIG. 19.

Compared with the power terminal module 2 in the first embodiment (as shown in FIG. 5), the power terminal module 2 in the second embodiment (as shown in FIGS. 19 and 20) does not have the insulating block 25. The first power terminal 21, the second power terminal 22, the third power terminal 23, and the fourth power terminal 24 of the power terminal module 2 in the second embodiment are similar in structure to the first power terminal 21, the second power terminal 22, the third power terminal 23 and the fourth power terminal 24 in the first embodiment, respectively, which will not be repeated in the present disclosure.

During assembly, the first power terminal 21, the second power terminal 22, the third power terminal 23 and the fourth power terminal 24 shown in FIG. 19 and FIG. 20 are assembled forwardly to the insulating body 1 along the third direction A3-A3. The first fixing portion 211 of the first power terminal 21, the second fixing portion 221 of the second power terminal 22, the third fixing portion 231 of the third power terminal 23, and the fourth fixing portion 241 of the fourth power terminal 24 are respectively fixed in the corresponding terminal assembly grooves 18.

As shown in FIG. 3 and FIG. 4, the plurality of conductive terminals 3 are installed and fixed in the plurality of installation grooves 16. Each conductive terminal 3 includes a resilient contact portion 31 extending into the second mating slot 14 and a tail portion 32 extending beyond the insulating body 1. The tail portion 32 is used for being mounted on the circuit board. According to different application requirements, the plurality of conductive terminals 3 may be power terminals and/or signal terminals.

Compared with the prior art, the present disclosure has the first abutting arm 2113 and the second abutting arm 2114 which abut against the third elastic arm 2211 and the fourth elastic arm 2212, respectively, thereby improving the plugging force of the third elastic arm 2211 and the fourth elastic arm 2212 when mating with the mating connector. In addition, due to the increased heat dissipation area, the heat dissipation performance of the power terminal is also improved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A power connector, comprising:
    an insulating body comprising a first mating surface and a first mating slot extending through the first mating surface; and
    a power terminal module fixed to the insulating body, the power terminal module comprising a first power terminal and a second power terminal, the first power terminal comprising a first fixing portion and a plurality of elastic arms extending from the first fixing portion; the plurality of elastic arms of the first power terminal comprising a first elastic arm, a second elastic arm arranged side by side with the first elastic arm, a first abutting arm arranged side by side with the first elastic arm and away from the second elastic arm, and a second abutting arm arranged side by side with the second elastic arm and away from the first elastic arm; the first abutting arm, the first elastic arm, the second elastic arm and the second abutting arm being arranged at intervals along a first direction; the first elastic arm and the second elastic arm being located between the first abutting arm and the second abutting arm; the first elastic arm comprising a first mating portion protruding into the first mating slot; the second elastic arm comprising a second mating portion protruding into the first mating slot;
    wherein the second power terminal comprises a second fixing portion and a plurality of elastic arms extending from the second fixing portion; the plurality of elastic arms of the second power terminal comprise a third elastic arm and a fourth elastic arm; the first fixing portion and the second fixing portion are arranged along a second direction perpendicular to the first direction; the third elastic arm and the fourth elastic arm are arranged at intervals along the first direction; the second power terminal further comprises a space between the third elastic arm and the fourth elastic arm along the first direction; the third elastic arm comprises a third mating portion protruding into the first mating slot; and the fourth elastic arm comprises a fourth mating portion protruding into the first mating slot; and
    wherein the first elastic arm and the second elastic arm extend into the space; the first abutting arm abuts against the third elastic arm along the second direction; and the second abutting arm abuts against the fourth elastic arm along the second direction.

2. The power connector according to claim 1, wherein the first mating portion comprises a first arc-shaped contact surface and a first recess opposite to the first arc-shaped contact surface; the second mating portion comprises a second arc-shaped contact surface and a second recess opposite to the second arc-shaped contact surface; the third mating portion comprises a third arc-shaped contact surface and a third recess opposite to the third arc-shaped contact surface; the fourth mating portion comprises a fourth arc-shaped contact surface and a fourth recess opposite to the fourth arc-shaped contact surface;

wherein a top of the first arc-shaped contact surface, a top of the second arc-shaped contact surface, a top of the third arc-shaped contact surface, and a top of the fourth arc-shaped contact surface are located in a same plane.

3. The power connector according to claim 2, wherein the first abutting arm has a first free end, the second abutting arm has a second free end, the first free end extends into the third recess to abut against the third mating portion, and the second free end extends into the fourth recess to abut against the fourth mating portion.

4. The power connector according to claim 3, wherein the first free end is bent toward the third mating portion; and the second free end is bent toward the fourth mating portion.

5. The power connector according to claim 3, wherein along a third direction which is perpendicular to the first direction and the second direction, a length of the first abutting arm is smaller than a length of the third elastic arm, and a length of the second abutting arm is smaller than a length of the fourth elastic arm; and wherein the first free end is provided with a first arc-shaped surface abutting against the third mating portion; and the second free end is provided with a second arc-shaped surface abutting against the fourth mating portion.

6. The power connector according to claim 1, wherein a width of the first abutting arm along the first direction is smaller than a width of the first elastic arm along the first direction; the width of the first abutting arm along the first direction is smaller than a width of the second elastic arm along the first direction; and wherein a width of the second abutting arm along the first direction is smaller than the width of the first elastic arm along the first direction; and the width of the second abutting arm along the first direction is smaller than the width of the second elastic arm along the first direction.

7. The power connector according to claim 1, wherein the power terminal module comprises a third power terminal and a fourth power terminal, the third power terminal comprises a third fixing portion and a plurality of elastic arms extending from the third fixing portion, the elastic arms of the third power terminal and the elastic arms of the first power terminal are symmetrically arranged on two sides of the first mating slot; and wherein the fourth power terminal comprises a fourth fixing portion and a plurality of elastic arms extending from the fourth fixing portion, the elastic arms of the fourth power terminal and the elastic arms of the second power terminal are symmetrically arranged on the two sides of the first mating slot.

8. The power connector according to claim 7, further comprising an insulating block fixed on the first fixing portion, the second fixing portion, the third fixing portion and the fourth fixing portion; the insulating body comprises an installation space communicating with the first mating slot; and the insulating block is at least partially installed in the installation space.

9. The power connector according to claim 8, wherein the first fixing portion, the second fixing portion, the third fixing portion and the fourth fixing portion are insert-molded with the insulating block.

10. The power connector according to claim 7, wherein the first power terminal comprises a first mounting portion, the second power terminal comprises a second mounting portion, the third power terminal comprises a third mounting portion, and the fourth power terminal comprises a fourth mounting portion;

wherein the first mounting portion, the second mounting portion, the third mounting portion and the fourth mounting portion are configured to be mounted to a circuit board; and wherein the first mounting portion, the second mounting portion, the third mounting portion and the fourth mounting portion are arranged at intervals along a third direction perpendicular to the first direction and the second direction.

11. The power connector according to claim 1, wherein the insulating body comprises a plurality of partitions protruding into the first mating slot, the plurality of partitions divide the first mating slot into a plurality of sub-slots, and each of the sub-slots corresponds to one power terminal module.

12. The power connector according to claim 1, wherein the insulating body comprises a second mating surface, a second mating slot extending through the second mating surface, and a plurality of installation slots communicating with the second mating slot; the power connector further comprises a plurality of conductive terminals fixed in the plurality of installation slots; and each conductive terminal comprises an elastic contact portion extending into the second mating slot.

13. The power connector according to claim 1, wherein the insulating body comprises a first mounting surface opposite to the first mating surface, and a plurality of terminal assembly grooves extending through the first mounting surface and communicating with the first mating slot; the first fixing portion of the first power terminal and the second fixing portion of the second power terminal are assembled and fixed in corresponding terminal assembly grooves.

14. A power connector, comprising:
an insulating body comprising a first mating surface and a first mating slot extending through the first mating surface;
a first power terminal comprising a first fixing portion fixed to the insulating body and a plurality of elastic arms extending from the first fixing portion; the plurality of elastic arms of the first power terminal comprising a first elastic arm, a second elastic arm arranged side by side with the first elastic arm, a first abutting arm arranged side by side with the first elastic arm and away from the second elastic arm, and a second abutting arm arranged side by side with the second elastic arm and away from the first elastic arm; the first abutting arm, the first elastic arm, the second elastic arm and the second abutting arm being arranged at intervals along a first direction; the first elastic arm and the second elastic arm being located between the first abutting arm and the second abutting arm; the first elastic arm comprising a first mating portion protruding into the first mating slot; the second elastic arm comprising a second mating portion protruding into the first mating slot; and
a second power terminal comprising a second fixing portion fixed to the insulating body and a plurality of elastic arms extending from the second fixing portion; the plurality of elastic arms of the second power terminal comprising a third elastic arm and a fourth elastic arm; the first fixing portion and the second fixing portion being arranged along a second direction perpendicular to the first direction; the third elastic arm and the fourth elastic arm being arranged at intervals along the first direction; the second power terminal further comprising a space between the third elastic arm and the fourth elastic arm along the first direction; the third elastic arm comprising a third mating portion protruding into the first mating slot; and the fourth elastic arm comprising a fourth mating portion protruding into the first mating slot; and wherein the first elastic arm and the second elastic arm extend into the space; the first abutting arm abuts against the third elastic arm along the second direction; and the second abutting arm abuts against the fourth elastic arm along the second direction.

15. The power connector according to claim 14, wherein the first mating portion comprises a first arc-shaped contact surface and a first recess opposite to the first arc-shaped contact surface; the second mating portion comprises a second arc-shaped contact surface and a second recess opposite to the second arc-shaped contact surface; the third mating portion comprises a third arc-shaped contact surface and a third recess opposite to the third arc-shaped contact surface; the fourth mating portion comprises a fourth arc-shaped contact surface and a fourth recess opposite to the fourth arc-shaped contact surface;

wherein a top of the first arc-shaped contact surface, a top of the second arc-shaped contact surface, a top of the third arc-shaped contact surface, and a top of the fourth arc-shaped contact surface are located in a same plane.

16. The power connector according to claim 15, wherein the first abutting arm has a first free end, the second abutting arm has a second free end, the first free end extends into the third recess to abut against the third mating portion, and the second free end extends into the fourth recess to abut against the fourth mating portion.

17. The power connector according to claim 16, wherein the first free end is bent toward the third mating portion; and the second free end is bent toward the fourth mating portion.

18. The power connector according to claim 16, wherein along a third direction which is perpendicular to the first direction and the second direction, a length of the first abutting arm is smaller than a length of the third elastic arm, and a length of the second abutting arm is smaller than a length of the fourth elastic arm; and wherein the first free end is provided with a first arc-shaped surface abutting against the third mating portion; and the second free end is provided with a second arc-shaped surface abutting against the fourth mating portion.

19. The power connector according to claim 14, wherein a width of the first abutting arm along the first direction is smaller than a width of the first elastic arm along the first direction; the width of the first abutting arm along the first direction is smaller than a width of the second elastic arm along the first direction; and wherein a width of the second abutting arm along the first direction is smaller than the width of the first elastic arm along the first direction; and the width of the second abutting arm along the first direction is smaller than the width of the second elastic arm along the first direction.

20. The power connector according to claim 14, further comprising a third power terminal and a fourth power terminal, the third power terminal comprising a third fixing portion and a plurality of elastic arms extending from the third fixing portion, the elastic arms of the third power terminal and the elastic arms of the first power terminal being symmetrically arranged on two sides of the first mating slot;

wherein the fourth power terminal comprises a fourth fixing portion and a plurality of elastic arms extending from the fourth fixing portion, the elastic arms of the fourth power terminal and the elastic arms of the second power terminal are symmetrically arranged on the two sides of the first mating slot.

* * * * *